US012192263B2

United States Patent
Li et al.

(10) Patent No.: US 12,192,263 B2
(45) Date of Patent: Jan. 7, 2025

(54) SYSTEMS AND METHODS FOR QUALITY OF EXPERIENCE COMPUTATION

(71) Applicant: Adeia Guides, Inc., San Jose, CA (US)

(72) Inventors: Zhu Li, Overland Park, KS (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/890,683

(22) Filed: Aug. 18, 2022

(65) Prior Publication Data

US 2024/0064189 A1    Feb. 22, 2024

(51) Int. Cl.
*H04L 65/80* (2022.01)
*G06N 20/00* (2019.01)
*H04L 65/75* (2022.01)

(52) U.S. Cl.
CPC ............ *H04L 65/80* (2013.01); *G06N 20/00* (2019.01); *H04L 65/75* (2022.05)

(58) Field of Classification Search
CPC ....... H04L 65/80; H04L 65/75; H04L 65/752; H04L 65/60; H04L 65/70; H04L 65/764; G06N 20/00; G06N 3/0464; G06N 3/088; G06N 3/09; G06N 3/092; G06N 3/0455; H04N 19/154
See application file for complete search history.

(56) References Cited

U.S. PATENT DOCUMENTS

| | | | | |
|---|---|---|---|---|
| 2018/0176576 A1* | 6/2018 | Rippel | .................. | G06N 3/0455 |
| 2018/0314925 A1* | 11/2018 | Gauci | ..................... | G06N 3/006 |
| 2021/0194733 A1* | 6/2021 | Huangfu | ................. | G06N 3/084 |
| 2021/0314573 A1* | 10/2021 | Zhang | ..................... | H04N 19/30 |
| 2022/0036635 A1* | 2/2022 | Li | ............................ | G06T 7/579 |
| 2022/0374714 A1* | 11/2022 | Nayak | ....................... | G06N 3/09 |
| 2023/0024884 A1* | 1/2023 | Casserini | ............. | G06F 18/217 |
| 2023/0088688 A1* | 3/2023 | Grois | ................. | H04N 21/2662 |
| | | | | 709/231 |
| 2023/0099526 A1* | 3/2023 | Chinen | .................. | G06F 18/24 |
| | | | | 382/254 |

(Continued)

OTHER PUBLICATIONS

Aaron et al., "Toward a practical perceptual video quality metric," The Netflix TechBlog, vol. 6 (2016).

(Continued)

*Primary Examiner* — Schquita D Goodwin
*Assistant Examiner* — Mehulkumar J Shah
(74) *Attorney, Agent, or Firm* — Haley Guiliano LLP (57) ABSTRACT

The system trains a machine learning model using a loss function, with a part that penalizes overall signal loss, and a second part of the loss function that penalizes texture loss. The system computes a first neural feature of a first media frame stored by a media server using the trained machine learning model. The system causes a client device to receive a second media frame as a part of a media stream from the media server where the second frame is a modified version of the first media frame. The system causes the client to compute a second neural feature of the second media frame using the trained machine learning model, and compute a QoE metric based on the first neural feature and the second neural feature. The system receives the QoE metric, and uses it to modify at least one parameter of the media stream.

17 Claims, 7 Drawing Sheets

(56) References Cited

U.S. PATENT DOCUMENTS

2024/0064189 A1    2/2024   Li et al.

OTHER PUBLICATIONS

Balle et al., "Variational image compression with a scale hyperprior," ICLR (2018).
Kawano et al., "No reference video-quality-assessment model for video streaming services," 2010 18th International Packet Video Workshop, pp. 158-164 (2010).
Li et al., "Image Quality Assessment by Separately Evaluating Detail Losses and Additive Impairments," IEEE Transactions on Multimedia, 13(5):935-949 (2011).
Masci et al., "Stacked convolutional auto-encoders forhierarchical feature extraction," Artificial Neural Networks and Machine Learning—ICANN, pp. 52-59 (2011) (8 pages).
Sheikh et al., "Image Information and Visual Quality," IEEE Transactions on Image Processing, 15(2):430-444 (2006).
Wang et al., "Image Quality Assessment: From Error Visibility to Structural Similarity," IEEE Transactions on Image Processing, 13(4):600-612 (2004).
Ma, et al., "Reduced-Reference Stereoscopic Image Quality Assessment Using Gradient Sparse Representation and Structural Degradation," IEEE Access, 9: 157134-157150 (2021).
Wenjing, et al, "Reduced-reference video QoE assessment method based on image feature information", 2015 17th Asia-Pacific Network Operations and Management Symposium (APNOMS), Busan, Korea (South), pp. 519-522 (2015).

* cited by examiner

SYSTEMS AND METHODS FOR QUALITY OF EXPERIENCE COMPUTATION

BACKGROUND

This disclosure is directed to systems and methods for verifying quality of experience of a media stream. In particular, systems and methods are provided for using an autoencoder to generate neural features (e.g., light weight neural features) of a frame at a server and neural features of a transmitted version of the frame at a client, such that the comparison of the neural features is used to compute quality of experience metrics.

SUMMARY

Advancements in media delivery had enabled propagation of a variety of media streaming service using a variety of streaming services and protocols. One common issue that is faced by the media streaming services is the need to verify fidelity or quality of media received and played at a client device. A frame of media asset (e.g., video, multimedia, AR/VR, game, etc.) can degrade due to a variety of factors such as lossy encoding, network transmission, etc. In one approach the quality check can be performed by a server as part of a protocol (e.g., DASH) using pre-encoded segment with known quality. However, in this approach (and in particular for live streams), the client device cannot verify the quality of the media as it is actually received. Accordingly, it's common for streaming systems not to perform a quality check at a client side.

Failure to perform the client-side quality check may lead to a variety of negative consequences for the streaming system. The stream may be disconnected (e.g., via a user interface) if the performance is not acceptable. Worse, the system may be unable to take mitigation steps to improve the performance (e.g., switching the stream to a different edge server, adjusting parameters of the stream, etc.) when the client side quality is low.

To help address these issues, systems and methods are provided herein for measuring a quality of experience (QoE) metric for a stream from a media server to a client device and taking an appropriate mitigating action based on the QoE metric. The method utilizes a light machine learning model (e.g., a convolutional autoencoder) that can be executed to compute a neural feature of a frame sent by a server and a neural feature (e.g., a lightweight feature) of a frame received by a client device (which allows the client device to have a comparison data to measure or predict the quality of the received media stream). In some embodiments, the machine learning model is pre-trained using a data set of frames using a loss function where a part of the loss function penalizes overall signal loss, and another part of the loss function penalizes texture loss. In some embodiments, the loss function may include another part that penalizes excessive bit rate of the neural feature (or the compressed neutral feature).

Once the machine learning model is trained, the weights of the model may be stored by a stream server and also pre-transmitted to the client device that will receive the stream. In this way, the machine learning model may be operated at the client (e.g., as part of the streaming app or web page) and by the server. Once the stream (e.g., a live stream) begins, the server may input a selected frame of the stream into the machine learning model to obtain a first neural feature. The first neural feature is then transmitted (after optional compression) to the client device (e.g., as part of the stream). In one approach the arithmetic coding is applied to the first neural feature prior to transmission and the coded neural feature is included as part of a supplemental enhancement information for the media stream.

The client device may then receive a modified version of the first frame (a second frame). The modification may occur due to compression, unstable connection, or transmission errors. The client device is caused (e.g., by code of the app or the web page of the media streaming service) to compute a second neural feature of the media frame using the same trained machine learning model (e.g., by inputting the second frame into the trained convolutional autoencoder using the pre-transmitted weights).

The client is also caused (e.g., by code of the app or the web page of the media streaming service) to compute a Quality of Experience (QoE) metric based on the first neural feature and the second neural feature. For example, the client inputs the first neural feature and the second neural feature as inputs into a second trained machine learning model trained to receive two neural features as input and output a QoE metric. The QoE metric may be one of a peak signal to noise ratio measure, a structural similarity index measure, a video multi-method assessment fusion measure, a mean opinion score measure, a just noticeable difference measure, or a visual information fidelity measure.

The client is then caused to transmit the QoE metric to the server. The server may modify at least one parameter of the media stream based on the QoE metric. For example, the streaming may be switched to another server (e.g., an edge server closer to the client). In another example, the server may adjust bit rate of the stream. In another example, the server may modify storage location of frames of the stream (e.g., to a different content delivery network location or to faster local physical memory.)

In this way, the streaming server is able to leverage the computing capability of the client to easily acquire QoE metrics without adding a lot of extra network traffic (e.g., because only the neural feature of a frame and the QoE metric itself need to be signaled on the network). The server may then proactively use the QoE metric or metrics to adjust and improve parameters of the media stream.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
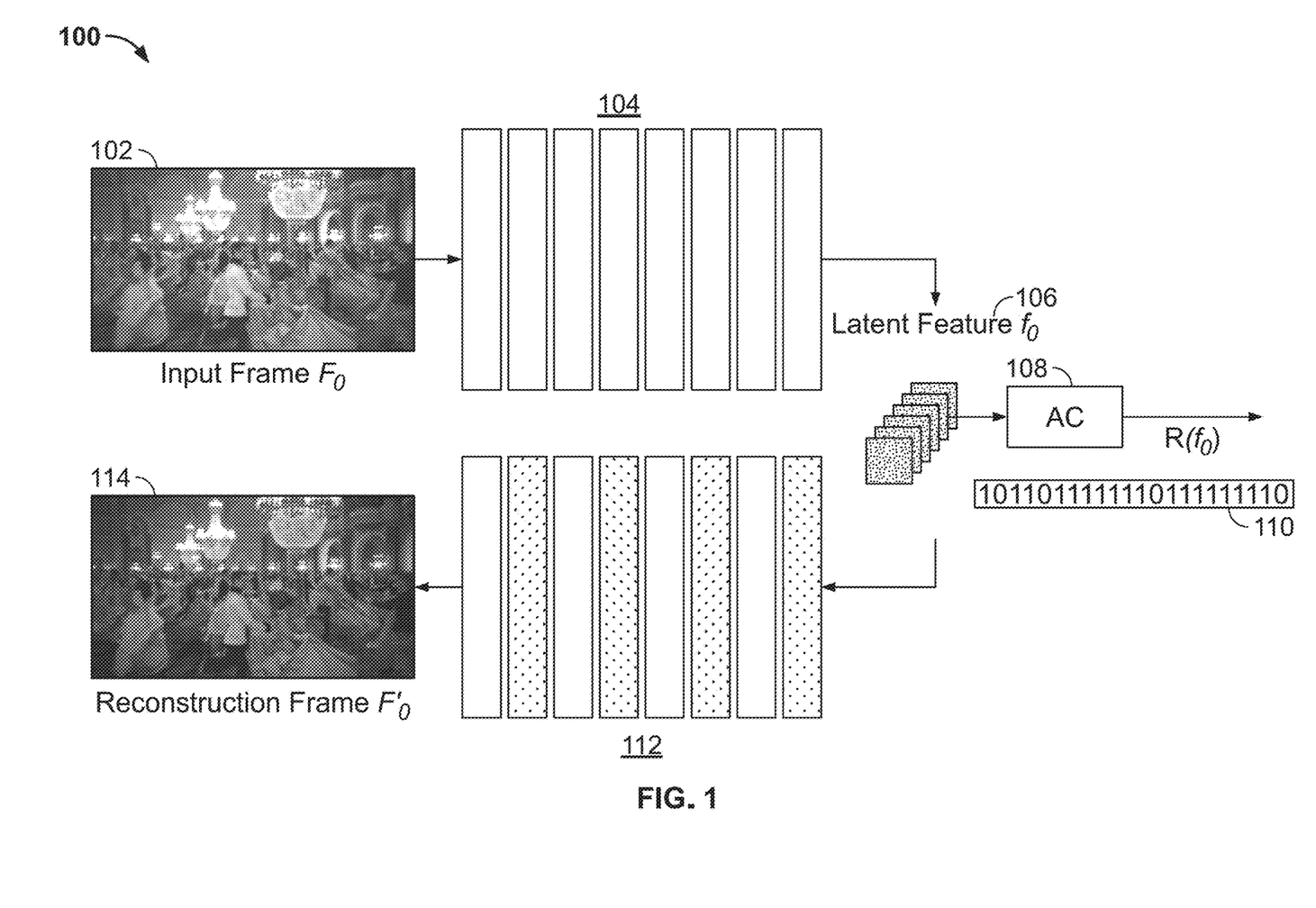
FIG. 1 shows an exemplary machine learning model for computing a neural feature of a frame, in accordance with some embodiments of this disclosure.

FIG. 1 shows an exemplary machine learning model 100 for computing a neural feature of a frame. As shown, a media application uses a machine learning model that is shown to operate using 2D frame as input (e.g., input frame $F_0$ 102 having dimensions H×W with three colors for each pixel), however in other embodiments any other type of frame input may be used (e.g., 3D frame for AR/VR/XR applications). The machine learning model (e.g., a convolutional Autoencoder) may include a portion 104 for downscaling the inputted frame to generate a latent feature $f_0$ 106. For example, portion 104 may be a convolutional neural network with 4 downscaling layers. For example, the initial input may be of H×W×3 (where H is the height of the frame 102 and W is the width of the frame 102), while the latent feature $f_0$ 106 may be configured to have the size of h×w×3 where h is smaller than H and where w is smaller than W. The exact value of h and w may be tuned to achieve a balance between fidelity of QoE estimation and resulting bitrate of signature R ($f_0$) 110. For example, if high fidelity of QoE estimation is required values of h and w may be larger than if network traffic savings are desired (because signature R ($f_0$) 110 will eventually be transmitted to the client as will be explained below). In one example, signature R ($f_0$) is obtained by applying Arithmetic Coding (AC) to the feature 108.

In one approach convolutional Autoencoder 104 may include a layer with data size 3×3×64, followed by a down sampling layer 3×3×64 (↓2) (where ↓ is down-sampling operator, e.g. that reduced dimension of the input), followed by layer with data size 3×3×128, followed by a down sampling layer 3×3×128(↓2), followed by layer with data size 3×3×256, followed by a down sampling layer 3×3×256 (↓2), follow by layer with data size 3×3×512, followed by a down sampling layer 3×3×512(↓2) which results in latent feature 106.

In some embodiments, during the training of the Autoencoder 104, the media application also uses reconstruction by a machine learning model 112, that is designed to reconstruct frame $F'_0$ 114 based on latent feature 106. For example, machine learning model 112 may use up sampling layers corresponding to down sampling layer of Autoencoder 104. Up-sampling and down-sampling are described, for example by "Fully Convolutional Networks for Semantic Segmentation," Jonathan Long, Proceedings of the IEEE Conference on Computer Vision and Pattern Recognition (CVPR), 2015, pp. 3431-3440, which is incorporated herein in its entirety.

During the training phase, media applications input frames (e.g., frame $F_0$ 102) of a certain database of frames into the neural network 104, resulting in the latent feature 106. The latent feature 106 is fed back through neural network 112 to recover a recovered frame (e.g., frame $F'_0$ 114). The weighs of neural network 104 and/or the weights of neural network 112 are adjusted based on results of a loss function that accepts as input frame $F_0$ 102 and recovered frame $F'_0$ 114.

In some embodiments, the lost function may include: (a) a first part of the loss function that penalizes overall signal loss, and (b) a second part of the loss function that penalizes texture loss. For example, the first part of the loss function $L_1(F_0, F'_0)$ may be computed as loss (e.g., L1 loss or absolute difference sum, L2 or sum of squared differences) in pixel domain which captures overall signal loss in energy. In another example, the second part of the loss function part may penalize detailed texture loss, as LoG (Laplacian of Gaussian) filtered image loss at multiple scales. For example, the scales may be σ=[1.2, 1.69, 2.0, 2.4] (however any other suitable set of scales may be used such as σ=[1.4, 1.58, 1.8, 2.7]). For example, the second part of the loss function may be defined by a formula $$L_2 = \lambda \sum_1^k L_1(LoG(F_0, \sigma_k) - LoG(F'_0, \sigma_k)),$$

where L1 is first part of the loss function described above, where λ is the regularizer for the texture loss, and where $\sigma_k$ a set of scales. In some embodiment, the overall loss function may be Loss $(F_0, F'_0) = L_1 + L_2$.

In another example, the loss function may have a third part that penalizes bit rate of signature $R(f_0)$ 110. In this example, the total loss function may be Loss $(F_0, F'_0) = L_1 + L_2 + \alpha R(f_0)$ where a is regularizer for Arithmetic Coding of feature 108. The weights of neural networks 104 and/or 112 may be adjusted to attempt to reduce the loss computed by loss function.

The process of feeding the same or different frames through neural network 104 and 112 and adjusting the weights may be repeated by the media application until loss function Loss $(F_0, F'_0)$ becomes very low (e.g., below a certain threshold) and/or until loss function Loss $(F_0, F'_0)$ stops decreasing. Once the neural network 104 is trained, the media application may store weights of neural network 104 in non-transitory memory. Such weights may also be provided to client devices serviced by the media application. In some embodiments, the media application may discard the weights of neural network 112, because frame reconstruction is not needed during streaming operations by the media application. In some embodiments, the training may be performed by another application (e.g., on the same or a different server) with the weights sent to the media application. Once the neural network 104 is trained, it may be used to estimate QoE metric of a media stream sent by the media application to a client as described above and below. Due to the robust training of the machine learning model 100, the estimate or prediction of the QoE metric of a media stream closely matches the ground truth of quality loss.

Figure 2:
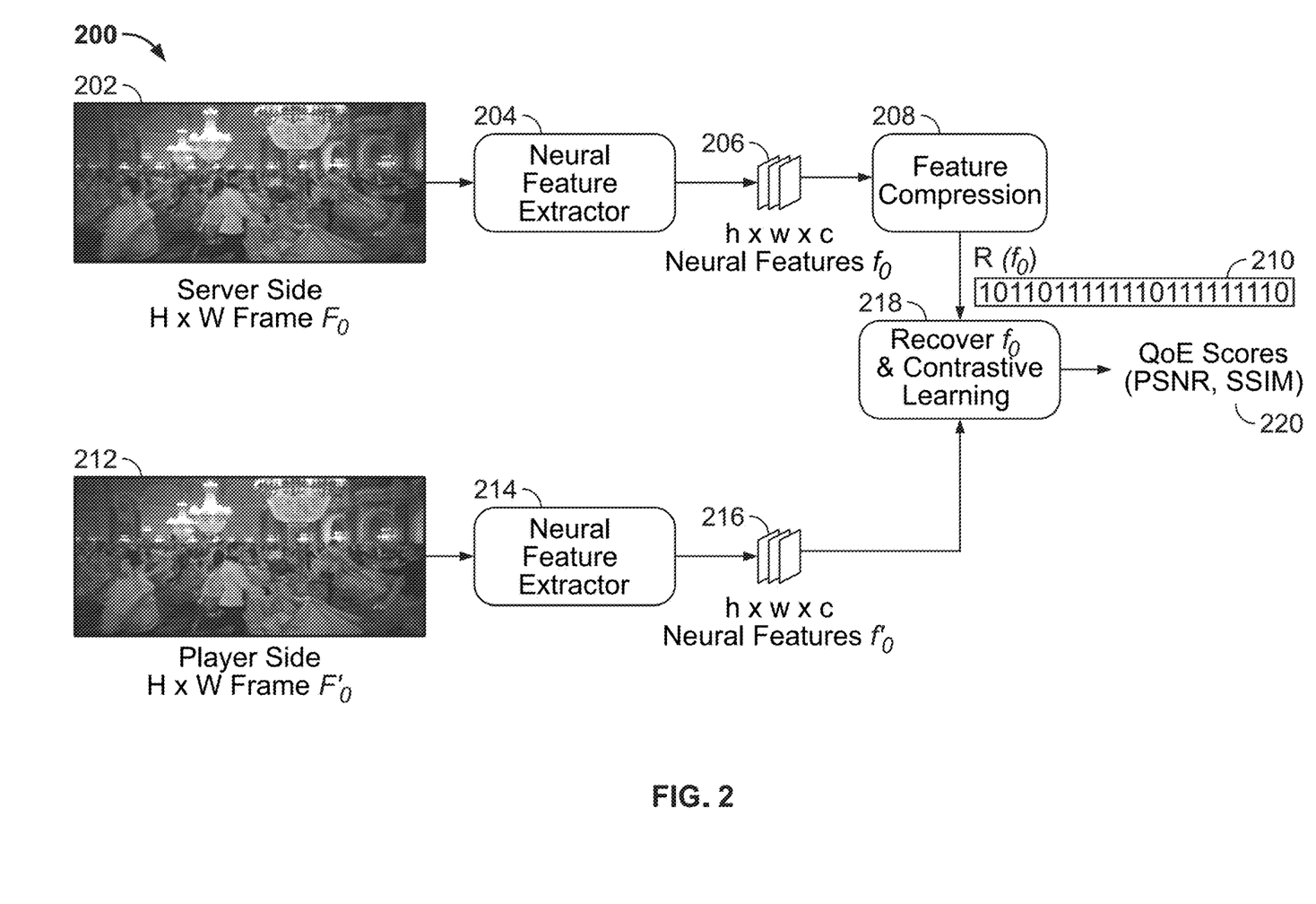
FIG. 2 shows an exemplary implementation of Quality of Experience (QoE) computation, in accordance with some embodiments of this disclosure.

As a result, of operations of machine learning model 100 described above, a light weight neural feature is produced by the trained autoencoder (e.g., by convolution layers of the encoder). Advantageously, the lightweight neural feature requires significantly less memory to store than the initial fame. Additionally, the size of the lightweight neural feature may be further reduced by compression techniques (e.g., application of arithmetic coding). As a result, the lightweight neural feature may be transferred over a network (e.g., to a client that decodes and plays the frames of the media stream) with low expenditure of memory, computing resources. and network bandwidth, FIG. 2 shows an exemplary implementation of Quality of Experience (QoE) computation 200, in accordance with some embodiments of this disclosure.

For example, during transmission of a stream from a server to a client device, media application executing on the server may analyze frame $F_0$ 202 of the media stream using neural feature extractor 204 (e.g., neural network 104 of FIG. 1). The feature extractor 204 may produce neural features $f_0$ 206. Neural features 206 (e.g., lightweight neural features) may be compressed (e.g., using arithmetic coding) at step 208 and signaled to the client (e.g., over a network). The compressed neural features 206 may be sent as part of the media stream, for example as one of the fields of the stream (e.g., as supplemental enhancement information).

The client than receives a degraded frame $F'_0$ 212 (e.g., due to compression loss or to network transmission loss) as part of the stream. The client may then be caused by the media application (e.g., executing as part of app code or browser code) to compute neural features of the neural features $f'_0$ 216 using neural feature extractor 214 (e.g., neural network 104 of FIG. 1). In one approach, extractors 204 and 214 are the same (e.g., the server may have signaled the weights of the neural network 104 to the client ahead of time as part of the stream or streaming app installation).

Figure 3:
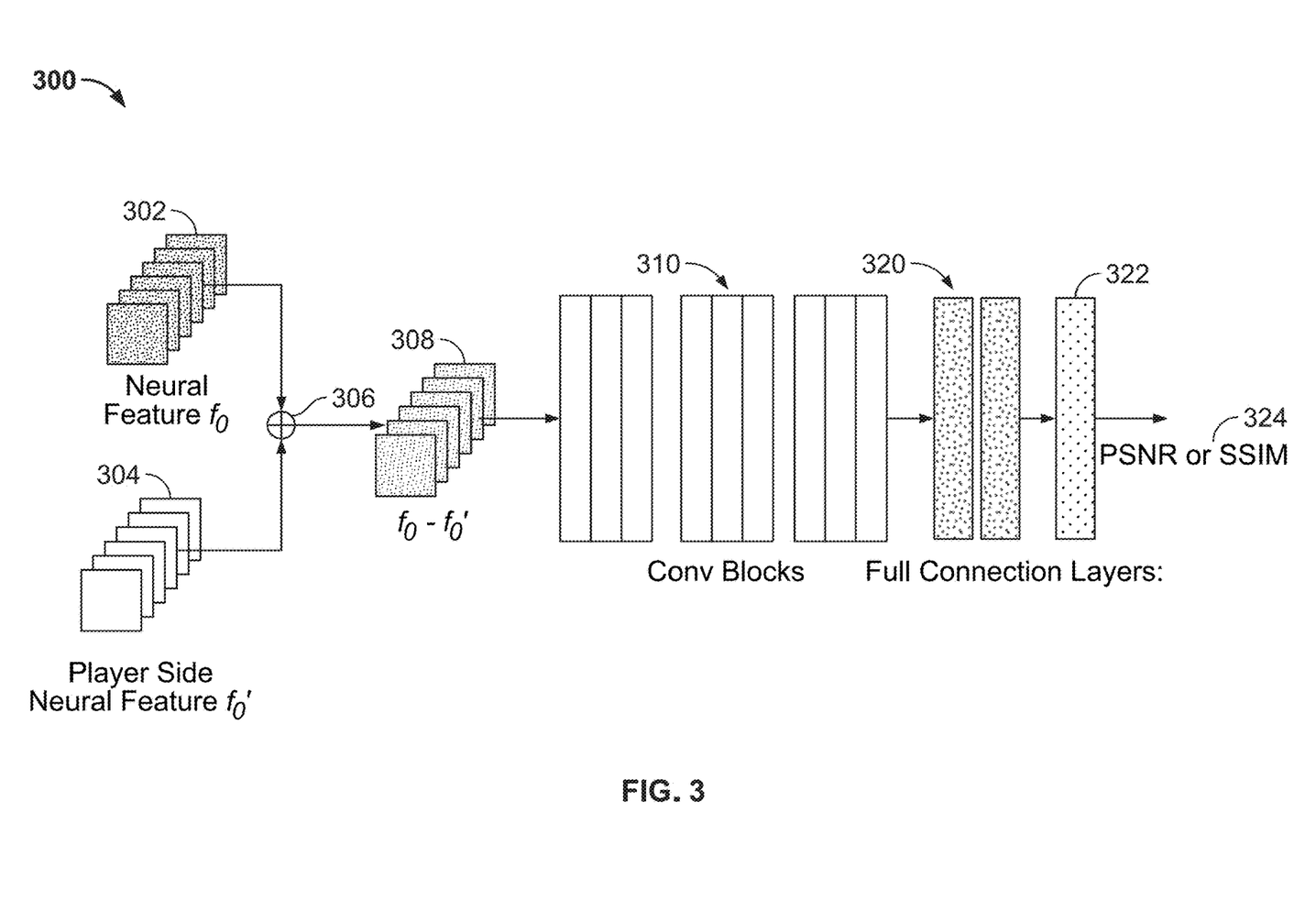
FIG. 3 shows another exemplary implementation of QoE computation, in accordance with some embodiments of this disclosure.

At step 213, the client may be caused to recover neural features $f_0$ 206 based on the compressed signal 210. Then, the client may be caused to compute 218 a QoE score based on the neural features $f_0$ 206 and neural features $f'_0$ 216. For example, the client may use contrastive learning module to compute at least one QoE metric. The QoE metric may be one or more of a peak signal to noise ratio measure, a structural similarity index measure, a video multi-method assessment fusion measure, a mean opinion score measure, a just noticeable difference measure, a visual information fidelity measure, or any combination of the above. One exemplary approach to compute the QoE metric is shown by FIG. 3. However, any other suitable way of computing the QoE metric based in neural features $f_0$ 206 and neural features $f'_0$ 216 may be used. Due to the robust training of the machine learning models, the estimate or prediction of the QoE metric of a media stream closely matches the ground truth of quality loss.

The client may then be caused to send the QoE metric back to the server. The server may then modify at least one parameter of the media stream based on the QoE metric.

FIG. 3 shows another exemplary implementation of QoE computation 300 (e.g., computation 218), in accordance with some embodiments of this disclosure. For example, the media application may cause the client device to compare 306 (e.g., by vector operation) the neural features $f_0$ 206 and neural features $f'_0$ 216. The result of the comparison 308 may be inputted into a neural network that includes a set of convolution blocks 310, set of fully connected layers 320 (e.g., including a softmax layer 322) to produce a desired QoE metric (e.g., peak signal to noise ratio measure, structural similarity index measure, video multi-method assessment fusion measure, mean opinion score measure, a just noticeable difference measure, or visual information fidelity measure) or any other measurement.

For example, the QoE neural network 310 and 320 may be a shallow convolution network with 3 convolutional groups. A final convolutional feature of size K1=h/4×w/4×64 (where h an w are size of the neural features) is computed (e.g., using layers 310) and fed into two full connected layers (e.g., layers 320) with a rectified linear unit (e.g., layer 322) to produce a final embedding of 256-dimensional fully connected features, which in turn is used to select a likely value of a certain QoE metric.

Each convolution layer may, for example, be a ResBlock convolution net. ResBlock portions may be implemented, e.g., as described in "Deep Residual Learning for Image Recognition," He et al., Computer Vision and Pattern Recognition, Dec. 10, 2015, which is hereby incorporated by reference herein in its entirety. In another example, each convolution layer may, for example, be a VGG convolution net, e.g., as described in "Very Deep Convolutional Networks for Large-Scale Image Recognition," Karen Simonyan, Sep. 4, 2014, Computer Vision and Pattern Recognition, which is herein incorporated by reference in its entirety. Fully connected layers are further described by Chellapilla, "High Performance Convolutional Neural Networks for Document Processing," Tenth International Workshop on Frontiers in Handwriting Recognition, Université de Rennes, Oct. 1, 2006, which is hereby incorporated by reference herein in its entirety. The output of the fully connected neural layers 320 may then be used to directly estimate a likelihood of a certain QoE value using softmax layer.

Layers 310 and 320 may be pre-trained using exemplary values of neural features $f_0$ 206 and neural features $f'_0$ 216 (e.g., lightweight neural features) and known ground truth about quality loss between first frame for which neural features $f_0$ 206 are computed and second frame (e.g., modified first frame) for which neural features $f'_0$ 216 is computed. The weights of layers 310 and 320 may be changed until output 324 starts matching the known ground truth sufficiently well. In some embodiments, multiple layers 310 and 320 may be trained to compute differ types of QoE metrics. In one approach, the weights for layers 310 and 320 may be sent to client device by media application (e.g., as part of the stream or as part of app installation or as part of loading a web page of the streaming service).

Figure 4:
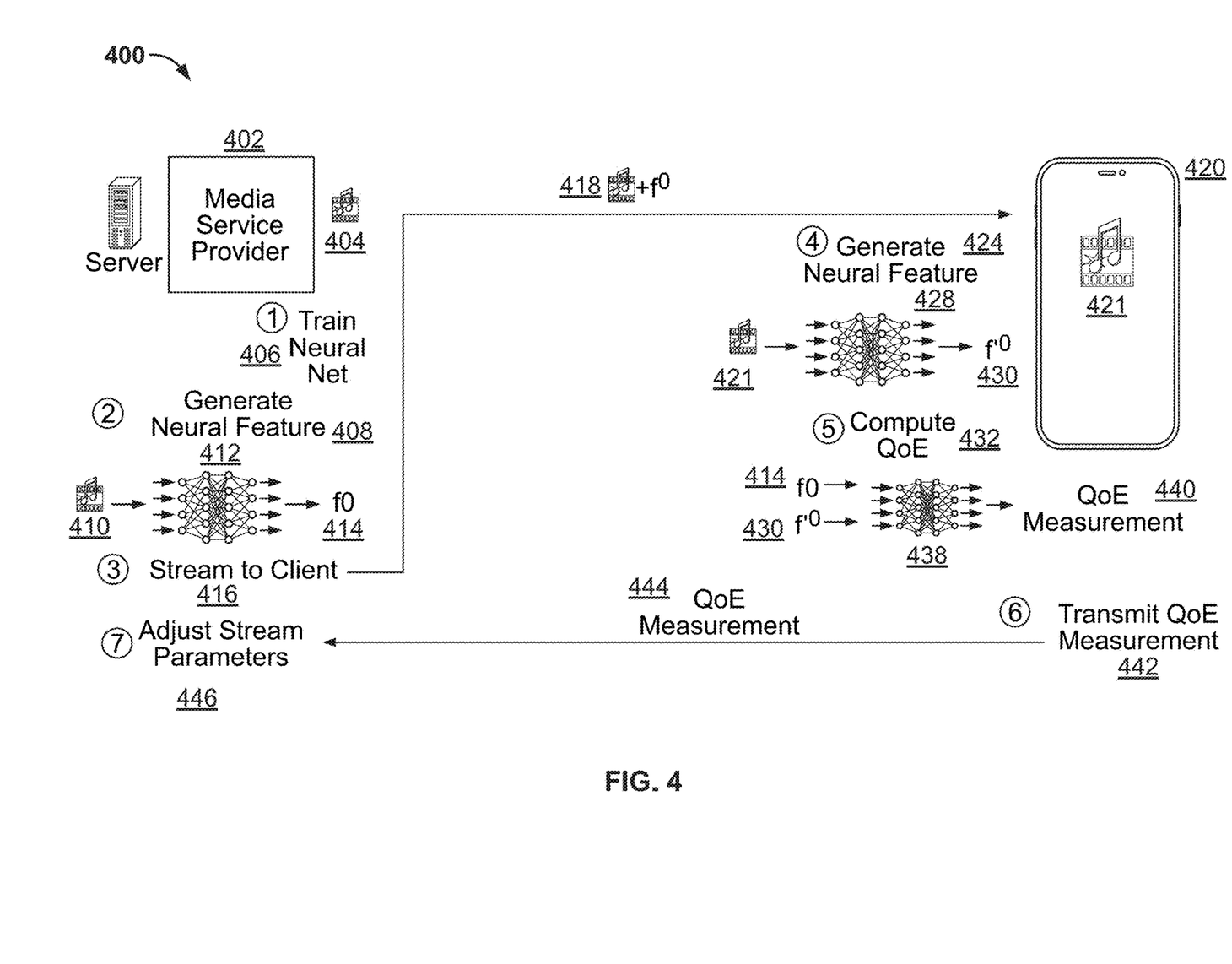
FIG. 4 shows an illustrative technique measuring QoE during a stream, in accordance with some embodiments of this disclosure.

FIG. 4 shows an illustrative technique measuring QoE 400 during a stream, in accordance with some embodiments of this disclosure.

Process 400 begins when server 402 (e.g., of a streaming media service provider) establishes a stream of media content 404. Media content 404 may be video, VR/AR/XT experience stream, a video game stream, conference stream, a combination of the above or any other suitable type of a media stream. Media content 404 may be a live stream generated in real time (e.g., using a camera).

At 406, the media application may train a first neural net 412 for feature extraction. Step 406 may be performed ahead of time or when the stream begins. The first neural net 412 for feature extraction may be trained as neural net 104 of FIG. 1. For example, the training may use a loss function with (a) a first part that penalizes overall signal loss and (b) a second part of the that penalizes texture loss as described in relation to FIG. 1.

During the streaming of media asset 404 to client 420, the media application may input a frame 410 of the asset 404 into first neural net 412 to extract neural feature $f_0$ 414 (e.g., lightweight neural feature). The stream 418 to client 420 may include neural feature $f_0$ 414 (or compressed version of the neural feature $f_0$ 414) and identification of the frame from which it was extracted.

At step 424, client device 420 may recover and generate for display a degraded or modified version 421 of frame 410. The client device 420 may also use neural network 428 (e.g., the same as neural network 412) to compute neural feature $f'_0$ 430.

At step 432, client device 420 may use neural feature $f_0$ 414 (received directly or recovered from compressed version) and computed neural feature $f'_0$ 430 to compute a QoE metric for the stream 418. For example, neural feature $f_0$ 414 and neural feature $f'_0$ 430 may be inputted into a second neural network 438 (e.g., the same as neural network 300 of FIG. 3) to obtain QoE measurement 440 (e.g., the same as one metrics 324 of FIG. 3).

At step 442, the client 420 may send 444 the QoE metric back to server 402. The server 402 may modify 446 at least one parameter of the media stream 418 based on the QoE metric. For example, the server 402 may be an edge server of a group of edge servers, and may transfer the stream to another edge server. In another example, the server 402 may adjust bit rate of the media stream (e.g., to increase or decrease the bit rate of frames sent to 420). In another example, the server 402 may change transmission standard. In yet another example, the server 402 may modify the storage location of frames of the media stream. For example, the server 402 may be using one or more CDN servers to store the frames, and a low QoE measurement may cause the server 402 to change which CDN server is used to store frames for the stream 418. In yet another example, the server 402 may change a type of memory used to store frames (e.g., hard disk storage may be changed to flash storage). The process may be repeated multiple times throughout the stream for multiple frames of media content 404 to continuously adjust stream parameters of stream 418.

Figure 5:
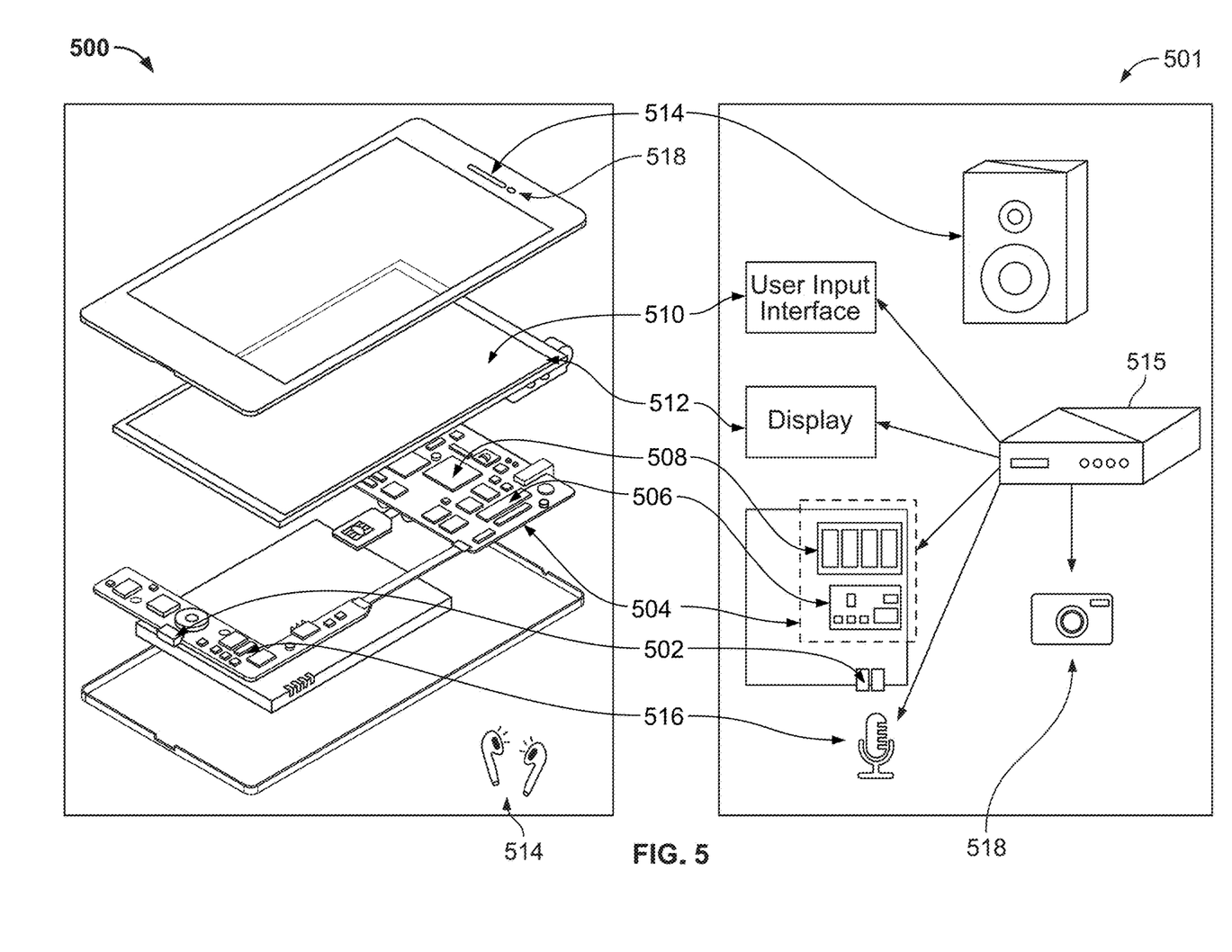
FIG. 5 shows an illustrative user equipment device, in accordance with some embodiments of this disclosure.
Figure 6:
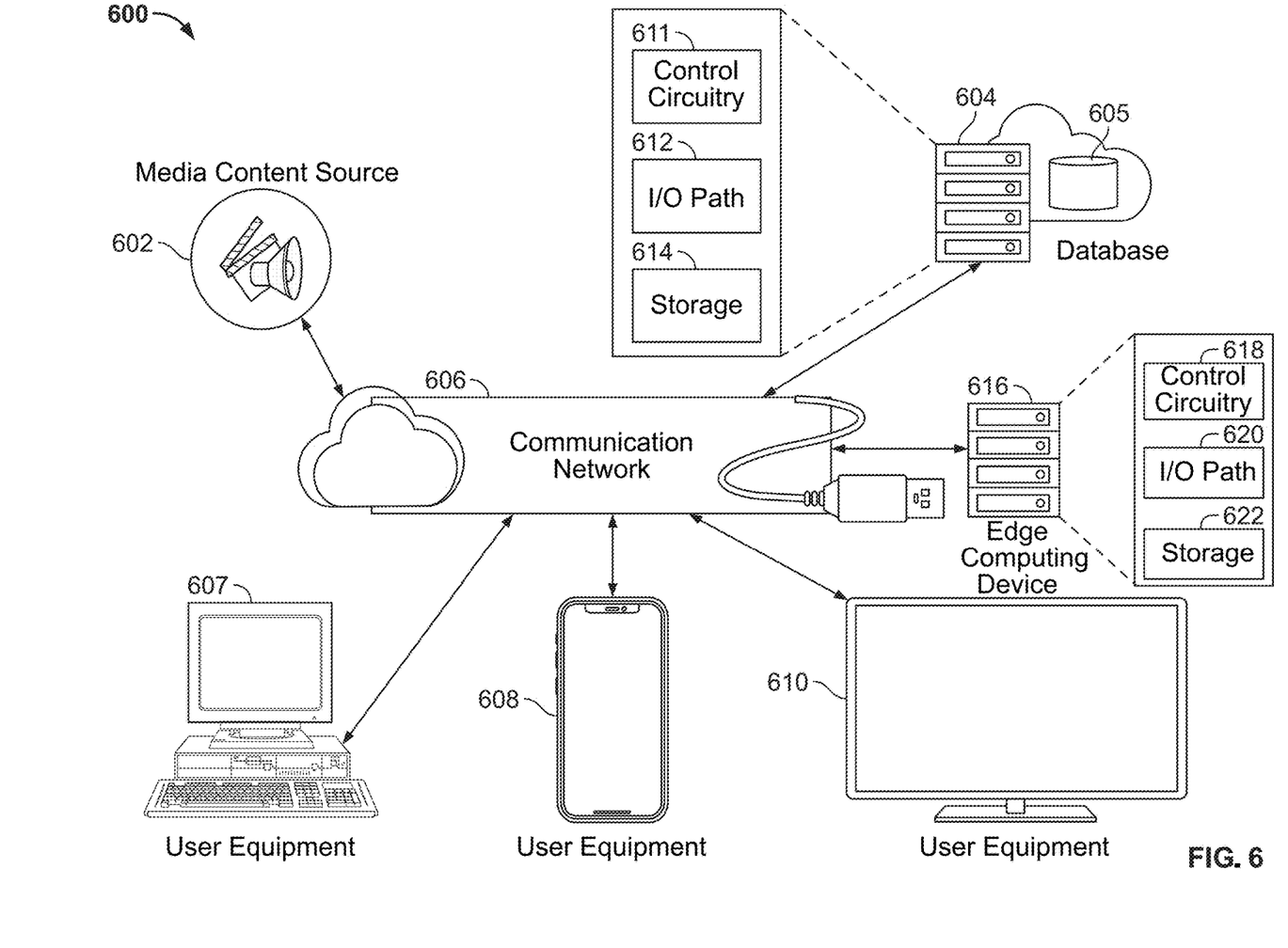
FIG. 6 shows an example system, in accordance with some embodiments of this disclosure.

FIGS. 5-6 depict illustrative devices, systems, servers, and related hardware for image feature detection. FIG. 5 shows generalized embodiments of illustrative user equipment devices 500 and 501, which may correspond to, e.g., computing devices 402 and 420. For example, user equipment device 500 may be a smartphone device, a tablet, a virtual reality or augmented reality device, or any other suitable device capable of processing video data. In another example, user equipment device 501 may be a user television equipment system or device. User television equipment device 501 may include set-top box 515. Set-top box 515 may be communicatively connected to microphone 516, audio output equipment (e.g., speaker or headphones 514), and display 512. In some embodiments, display 512 may be a television display or a computer display. In some embodiments, set-top box 515 may be communicatively connected to user input interface 510. In some embodiments, user input interface 510 may be a remote-control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 500 and user equipment device 501 may receive content and data via input/output (I/O) path 502. I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 6 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the media application stored in memory (e.g., storage 508). Specifically, control circuitry 504 may be instructed by the media application to perform the functions discussed above and below. In some implementations, processing or actions performed by control circuitry 504 may be based on instructions received from the media application.

In client/server-based embodiments, control circuitry 504 may include communications circuitry suitable for communicating with a server or other networks or servers. The media application may be a stand-alone application implemented on a device or a server. The media application may be implemented as software or a set of executable instructions. The instructions for performing any of the embodiments discussed herein of the media application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a device 500.

In some embodiments, the media application may be a client/server application where only the client application resides on device 500 (e.g., device 104), and a server application resides on an external server (e.g., server 604 and/or server 616). For example, the media application may be implemented partially as a client application on control circuitry 504 of device 500 and partially on server 604 as a server application running on control circuitry 611. Server 604 may be a part of a local area network with one or more of devices 500 or may be part of a cloud computing environment accessed via the internet. In a cloud computing environment, various types of computing services for performing searches on the internet or informational databases, providing feature detection capabilities, providing storage (e.g., for a database) or parsing data (e.g., using machine learning algorithms described above and below) are provided by a collection of network-accessible computing and storage resources (e.g., server 604 and/or edge computing device 616), referred to as "the cloud." Device 600 may be a cloud client that relies on the cloud computing capabilities from server 604 to determine whether processing (e.g., at least a portion of virtual background processing and/or at least a portion of other processing tasks) should be offloaded from the mobile device, and facilitate such offloading. When executed by control circuitry of server 604 or 616, the media application may instruct control 611 or 618 circuitry to perform neural network training tasks and/or QoE computation tasks for the client device and server device.

Control circuitry 504 may include communications circuitry suitable for communicating with a server, edge computing systems and devices, a table or database server, or other networks or servers. The instructions for carrying out the above mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of user equipment 500. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive video feature detection data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of device 500 and equipment 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. In particular, Camera 518 may be a lensless CMOS sensor masked with a mask (e.g., as shown in FIG. 1 elements 102 and 104). Camera 518 may be an analog camera that converts to digital images via a video card.

The media application may be implemented using any suitable architecture. For example, it may be a stand-alone application wholly-implemented on each one of user equipment device 500 and user equipment device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide feature detection functionality and preform any of the actions discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the media application is a client/server-based application. Data for use by a thick or thin client implemented on each one of user equipment device 500 and user equipment device 501 may be retrieved on-demand by issuing requests to a server remote to each one of user equipment device 500 and user equipment device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

In some embodiments, the media application may be downloaded and interpreted or otherwise run by an interpreter or virtual machine (run by control circuitry 504). In some embodiments, the media application may be encoded in the ETV Binary Interchange Format (EBIF), received by control circuitry 504 as part of a suitable feed, and interpreted by a user agent running on control circuitry 504. For example, the media application may be an EBIF application. In some embodiments, the media application may be defined by a series of JAVA-based files that are received and run by a local virtual machine or other suitable middleware executed by control circuitry 504. In some of such embodiments (e.g., those employing MPEG-2 or other digital media encoding schemes), media application may be, for example, encoded and transmitted in an MPEG-2 object carousel with the MPEG audio and video packets of a program.

FIG. 6 is a diagram of an illustrative system 600 for feature detection, in accordance with some embodiments of this disclosure. User equipment devices 607, 608, 610 (e.g., which may correspond to one or more of computing device 212 may be coupled to communication network 606). Communication network 606 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 606.

System 600 may comprise media content source 602, one or more servers 604, and one or more edge computing devices 616 (e.g., included as part of an edge computing system, such as, for example, managed by mobile operator 206). In some embodiments, the media application may be executed at one or more of control circuitry 611 of server 604 (and/or control circuitry of user equipment devices 607, 608, 610 and/or control circuitry 618 of edge computing device 616). In some embodiments, data structure 300 of FIG. 3, may be stored at database 605 maintained at or otherwise associated with server 604, and/or at storage 622 and/or at storage of one or more of user equipment devices 607, 608, 610.

In some embodiments, server 604 may include control circuitry 611 and storage 614 (e.g., RAM, ROM, Hard Disk, Removable Disk, etc.). Storage 614 may store one or more databases. Server 604 may also include an input/output path 612. I/O path 612 may provide feature detection data, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically control circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 614). Memory may be an electronic storage device provided as storage 614 that is part of control circuitry 611.

Edge computing device 616 may comprise control circuitry 618, I/O path 620 and storage 622, which may be implemented in a similar manner as control circuitry 611, I/O path 612 and storage 624, respectively of server 604. Edge computing device 616 may be configured to be in communication with one or more of user equipment devices 607, 608, 610 and video server 604 over communication network 606, and may be configured to perform processing tasks (e.g., feature detection) in connection with ongoing processing of video data. In some embodiments, a plurality of edge computing devices 616 may be strategically located at various geographic locations, and may be mobile edge computing devices configured to provide processing support for mobile devices at various geographical regions.

Figure 7:
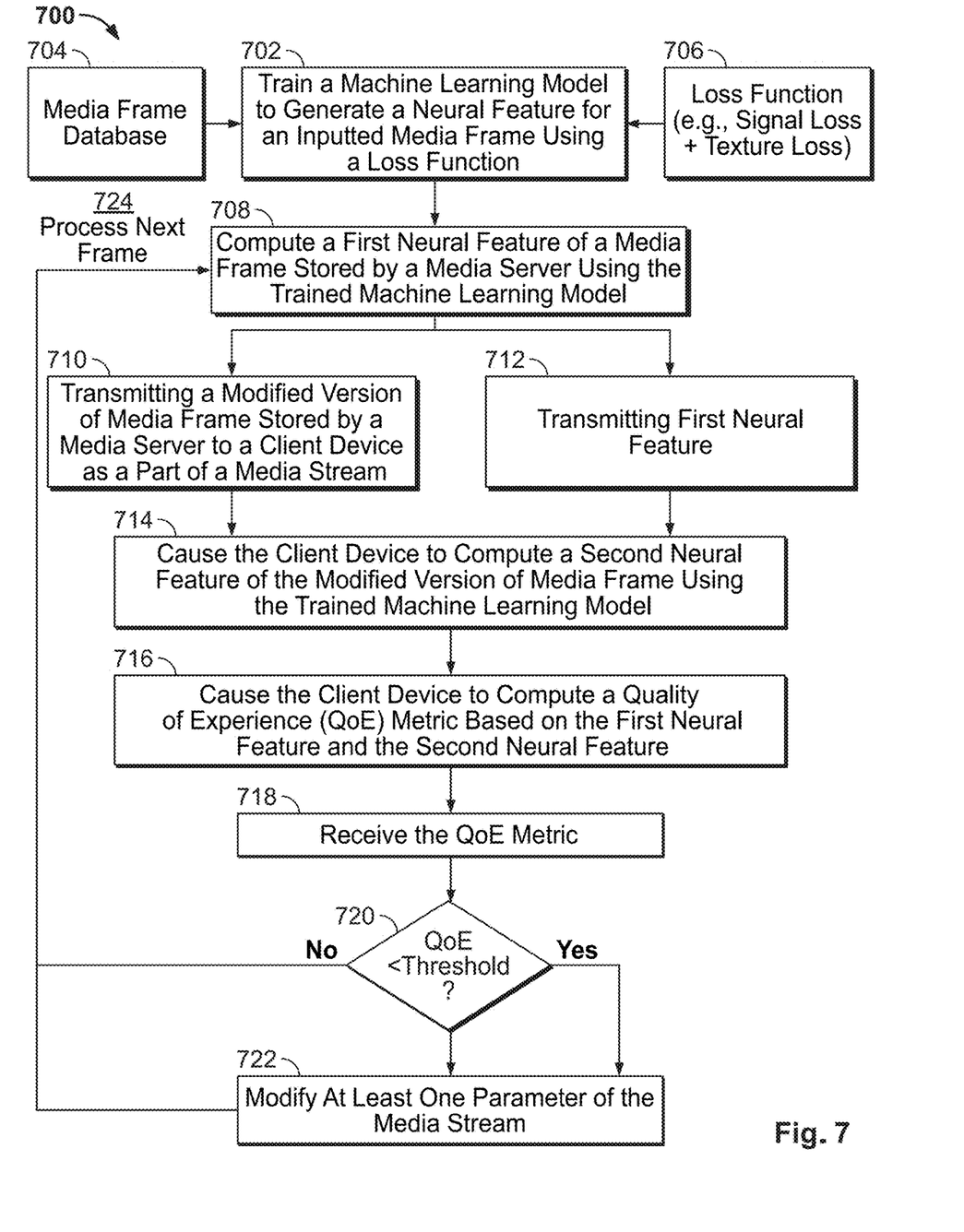
FIG. 7 is a flowchart of a detailed illustrative process for measuring QoE during a stream, in accordance with some embodiments of this disclosure.

FIG. 7 is a flowchart of a detailed illustrative process 700 for measuring QoE during a stream (e.g. a stream from server 402 to client 420), in accordance with some embodiments of this disclosure. In various embodiments, the individual steps of process 700 may be implemented by one or more components of the devices and systems of FIGS. 1-6. Although the present disclosure may describe certain steps of process 700 (and of other processes described herein) as being implemented by certain components of the devices and systems of FIGS. 1-6, this is for purposes of illustration only, and it should be understood that other components of the devices and systems of FIGS. 1-6 may implement those steps instead.

At training step 702, control circuitry (e.g., control circuitry 611, control circuitry 618, or control circuitry of any of devices 607, 608, or 610) may train a machine learning model (e.g., a model stored in storage 508). For example, the training step 706 may be performed during initial set up of streaming service 402. For example, the machine learning model may be trained to compute neural features of a frame.

In particular, the training step 702 may be performed by the control circuitry based on accessing frame database 704 that is known to include a variety of sample frames. Training step 702 may be performed using a loss function 706 that includes (a) a first part of the loss function that penalizes overall signal loss and (b) a second part of the loss function that penalizes texture loss. The loss function may also include a part that penalizes bit rate of the neural feature (or bit rate of the neural feature after it is processed by arithmetic coding). Some exemplary loss functions are described in connection to FIG. 1.

Once the stream begins (e.g., over network 606), the control circuitry proceeds to step 708 where it computes a first neural feature of a media frame stored by a media server using the trained machine learning model trained at step 702. At 710, the control circuitry transmits a modified version of a frame (e.g., a second frame) to a client device as part of the stream (e.g., using I/O circuitry 612). At 712, the control circuitry transmits (e.g., using I/O circuitry 612) the neural feature to the client. For example, the neural feature may be sent over network 606. In one approach the first neural feature of a first media frame is sent as part of a supplemental enhancement information for the media stream.

At 714, the control circuitry may cause control circuitry of client (e.g., client device 607, 608, or 610) to compute a second neural feature of the second frame (e.g., modified version of first media frame) using the same trained machine learning model. At 716, the control circuitry may cause control circuitry of a client (e.g., client devoice 607, 608, or 610) to compute a compute a Quality of Experience (QoE) metric based on the first neural feature and the second neural feature. For example, the control circuitry of client may use a second neural network trained as described in relation to FIG. 3. The control circuitry may cause control circuitry of client (e.g., client device 607, 608, or 610) to transmit the QoE metric back to the server (e.g., server 604).

At 718, the control circuitry may receive the QoE metric (e.g., via network 606). At 720, the control circuitry may compare the QoE metric to a threshold. If the threshold is not met, process 700 may continue 724 for a next frame (e.g., control circuitry may check QoE for frames at certain intervals) by repeating steps 708-722 for another frame of the stream.

If the threshold is met, the control circuitry may, at step 722, modify at least one parameter of the media stream. For example, the stream may be transferred, such that another edge server (e.g., server 616) streams the media asset to the client. In another example, the control circuitry may adjust bit rate of the media stream (e.g., live media may begin to be encoded more heavily). In yet another example, the control circuitry may modify the storage location of frames of the media stream. For example, storage may be switched from storage 614 to storage 622. Process 700 may then continue 724 for a next frame (e.g., control circuitry may check QoE for frames at certain interval) by repeating steps 708-722 for another frame of the stream.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   training a first machine learning model to generate a neural feature for an inputted media frame using a loss function, wherein a first part of the loss function penalizes overall signal loss and a second part of the loss function penalizes texture loss, wherein the first machine learning model comprises weights;
   computing a first neural feature of a first media frame stored by a media server using the trained first machine learning model;
   causing a client device to receive the first neural feature;
   causing the client device to receive a second media frame as a part of a media stream from the media server, wherein the second media frame is a degraded version of the first media frame, wherein the client device is configured to:
  receive the weights of the first machine learning model;
  compute a second neural feature of the second media frame using a second trained machine learning model, wherein the second machine learning model is configured with the received weights of the first machine learning model;
  compute a Quality of Experience (QoE) metric based at least on the first neural feature and the second neural feature;
receiving the QoE metric from the client device; and
modifying, based on the QoE metric, at least one parameter of the media stream transmitted by the media server.

2. The method of claim 1, wherein computing the QoE metric based on the first neural feature and the second neural feature comprises:
  inputting the first neural feature and the second neural feature as inputs into a third trained machine learning model trained to receive two neural features as input and to output at least one of a peak signal to noise ratio measure, a structural similarity index measure, a video multi-method assessment fusion measure, a mean opinion score measure, a just noticeable difference measure, or a visual information fidelity measure.

3. The method of claim 1, wherein the first neural feature is transmitted to the client device as part of a supplemental enhancement information for the media stream.

4. The method of claim 1, wherein the trained first machine learning model and the second machine learning model comprise convolutional auto encoders.

5. The method of claim 4, wherein arithmetic coding is applied to the first neural feature prior to transmission to the client device.

6. The method of claim 1, wherein the loss function comprises a third part that penalizes bit rate of the neural feature.

7. The method of claim 1, wherein the modifying at least one parameter of the media stream based on the QoE metric comprises switching the media stream to another server.

8. The method of claim 1, wherein the modifying at least one parameter of the media stream based on the QoE metric comprises adjusting bit rate of the media stream.

9. The method of claim 1, wherein the modifying at least one parameter of the media stream based on the QoE metric comprises modifying the storage location of frames of the media stream.

10. The method of claim 1, wherein the first neural feature and the second media frame are transmitted to the client by the media server.

11. A system comprising:
control circuitry configured to:
  train a first machine learning model to generate a neural feature for an inputted media frame using a loss function, wherein a first part of the loss function penalizes overall signal loss and a second part of the loss function penalizes texture loss, wherein the first machine learning model comprises weights;
  compute a first neural feature of a first media frame stored by a media server using the trained first machine learning model;
  cause the client device to receive the first neural feature;
  cause a client device to receive a second media frame as a part of a media stream from the media server, wherein the second media frame is a degraded version of the first media frame, wherein the client device is configured to:
    receive the weights of the first machine learning model;
    compute a second neural feature of the second media frame using a second trained machine learning model, wherein the second machine learning model is configured with the received weights of the first machine learning model;
    compute a Quality of Experience (QoE) metric based at least on the first neural feature and the second neural feature; and
an input/output circuitry configured to:
  receive the QoE metric; and
wherein the control circuitry is further configured to:
  modify, based on the QoE metric, at least one parameter of the media stream transmitted by the media server.

12. The system of claim 11, wherein the QoE metric is computed based on the first neural feature and the second neural feature by:
  inputting the first neural feature and the second neural feature as inputs into a third trained machine learning model trained to receive two neural features as input and to output at least one of a peak signal to noise ratio measure, a structural similarity index measure, a video multi-method assessment fusion measure, a mean opinion score measure, a just noticeable difference measure, or a visual information fidelity measure.

13. The system of claim 11, wherein the Input/Output circuitry is further configured to:
  transmit the first neural feature to the client device as part of a supplemental enhancement information for the media stream.

14. The system of claim 11, wherein the trained first machine learning model and the second machine learning model are convolutional auto encoders.

15. The system of claim 14, wherein the control circuitry is further configured to apply arithmetic coding to first neural feature prior to transmission to the client device.

16. The system of claim 11, wherein the loss function comprises a third part that penalizes bit rate of the neural feature.

17. The system of claim 11, wherein the control circuitry is configured to modify at least one parameter of the media stream based on the QoE metric by switching the media stream to another server.

* * * * *